United States Patent [19]

Ojima

[11] Patent Number: 5,055,089
[45] Date of Patent: Oct. 8, 1991

[54] BELT TENSIONER FOR POWER TRANSMITTING SYSTEM

[75] Inventor: Juji Ojima, Kanagawa, Japan

[73] Assignee: NHK Spring Co., Ltd., Yokohama, Japan

[21] Appl. No.: 524,447

[22] Filed: May 17, 1990

[30] Foreign Application Priority Data

May 22, 1989 [JP] Japan .................................. 1-128539

[51] Int. Cl.$^5$ ............................................. F16H 7/12
[52] U.S. Cl. ................................................. 474/138
[58] Field of Search ............... 474/101, 136, 109, 135, 474/136, 138, 117

[56] References Cited

U.S. PATENT DOCUMENTS

| 4,151,756 | 5/1979 | Binder et al. | 474/138 |
| 4,392,840 | 7/1983 | Radocaj | 474/117 |
| 4,416,648 | 11/1983 | Radocaj | 474/135 |

Primary Examiner—Ramon S. Britts
Assistant Examiner—Roger J. Schoeppel
Attorney, Agent, or Firm—Fleit, Jacobson, Cohn, Price, Holman & Stern

[57] ABSTRACT

A belt or chain tensioner has a tension rod which is urged by a compression spring. The forward stroke of the tension rod is normally released and the backward stroke of tension rod is locked normally by a locking component and released only when the retreating force of tension rod, due to the counterforce of the belt or chain, exceeds the gripping force of the locking component.

6 Claims, 4 Drawing Sheets

BELT TENSIONER FOR POWER TRANSMITTING SYSTEM

BACKGROUND OF THE INVENTION

The present invention relates to a tensioner for tensioning a belt or chain adequately by using an urging tension rod. More particularly, the present invention relates to such a tensioner which has a compression spring acting to operate the urging tension rod.

This type of tensioner is used to prevent a number of problems. When a tension rod is excessively urged due to the excessive variation of driving torque, the belt or chain becomes excessively tensioned. Sometimes as a result, buzzing or excessive wear on the belt or chain can result. Taking this undesirable situation into consideration, a tensioner has been disclosed by the Japanese Utility Model Application Laid-open No. 62-13257 in which the tension rod has been provided with a restoring capacity.

As shown in FIG. 7 of the present application, the tension rod 101 of a conventional tensioner ratchet 100 for tensioning a chain is mounted in a casing 104 so as to be urged freely by a compression spring 105. The tension rod 101 is provided with a rack portion on its side, and mating teeth of ratchet pawl 102 engage with the rack portion. A shaft 103, fixed on the ratchet pawl 102, is inserted in the vertical slot 106 so that the teeth of the ratchet pawl may slip on the rack to change its position. When the chain is slackened, normally, the tension rod 101 advances to keep adequate tension on the chain. The returning stroke of tension rod 101 is controlled by the ratchet pawl 102. On the other hand, when the chain is excessively tensioned, due to an excessive advance of tension rod 101, the shaft 103, fixed on the ratchet pawl 102, works to alleviate excessive tension.

Hereinafter, the problems to be solved by the invention will be explained. Since the back stroke of tension rod 101 is controlled by the ratchet pawl 102, the shaft 103 and vertical slot 106 as aforementioned, the back stroke of the tension rod 101, which has been excessively urged by the resonant amplitude of the tensioned belt or chain is terminated when the shaft 103 of ratchet pawl hits on the bottom of vertical slot 106 after coursing the full length of the slot, the tension rod 101 does not function to alleviate excessive tension of chain or belt because the tensioner only uses a regid object against the counterforce of the tensioned belt or chain.

The present invention has been developed considering the above situations and provides a tensioner having a prompt response to slackening, which functions to alleviate excessive tension on the belt or chain and which has a simple and compact construction.

SUMMARY OF THE INVENTION

In order to carry out the above purpose, the belt or chain tensioner according to the present invention is designed to keep adequate tension on belt or chain by using a compression spring mounted between the tension rod and a casing for urging the tension rod in an advancing direction. A cup shaped rear locking seat is fixed on the bottom of the casing, and the outer bottom of the cup has a step portion and, in a diametrically opposite position, another step portion is formed in advanced position in the urging direction of the tension rod so as to form two mating steps fixed in front of the rear locking seat. The open end of the cup is diagonally cut so as to form a mating inclined loop slope of the same width as the wall thickness for said rear locking seat. A locking component is inserted between the rear locking seat and the front locking seat for locking the tension rod. The tension rod is urged by a compression spring, and the forward stroke of the tension rod is normally released. The backward stroke of the tension rod is locked normally by the locking component and released only when the retreating force of the tension rod, due to the counterforce of the belt or chain, exceeds the gripping force of the locking component.

The locking seats also may work as a bearing for the tension rod. The locking seats may be of such construction that a plain surface and an inclined surface are incorporated, and also may be constructed with first and second components respectively comprising the surfaces.

Further, the locking component may be a coil spring or a flat washer.

DETAILED DESCRIPTION OF THE PREFERRED EMBODIMENTS

Hereinafter an embodiment of the chain tensioner according to the present invention will be described. Reference should be made to the drawings.

Figure 1:
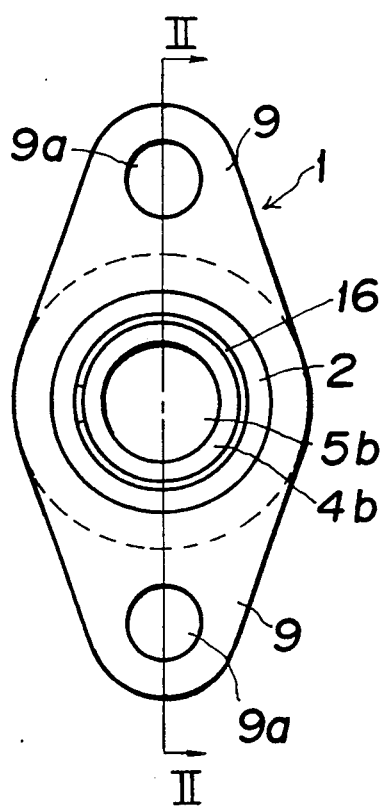
FIG. 1 shows a front view of an embodiment of the tensioner according to the present invention.
Figure 2:
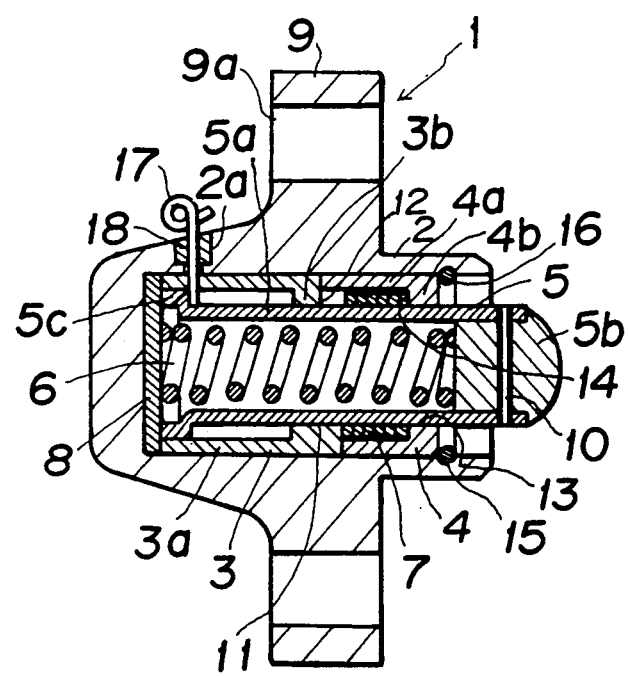
FIG. 2 shows a section along line II—II of FIG. 1.

In FIGS. 1 and 2, the belt tensioner 1 may be seen to comprise a casing 2 in cylinder form, with a closed bottom. A tension rod 5 is inserted slidably in a pair of locking seats 3 and 4. A compression spring 6 urges the tension rod 5, inserted in the casing 2, in an advancing direction, and a coil spring 7 is inserted between the locking seats 3 and 4 and is externally inserted over so as to surround the tension rod 5.

Further, the reference numeral 8 indicates a seat for a compression spring 6 in the casing 2 and the numeral 9 indicates a wing sticking out from the casing for fixing the tensioner on equipment. Two attaching holes 9a are formed on the wing.

The tension rod 5 has a cylinder portion 5a, a skirt portion 5c and a round head 5b fixed on the top of the tension rod with a spring pin 10. The skirt portion of tension rod 5 abuts on the seat 8 in the casing 2 and the round head sticks out of the casing 2.

Figure 3:
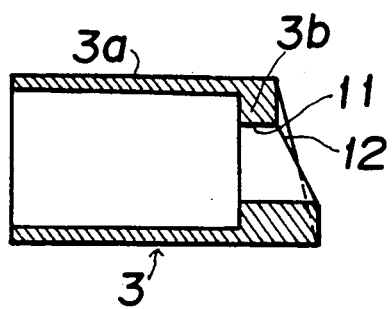
FIG. 3 shows a vertical section of the cup shaped rear locking seat used for the tensioner in FIG. 2.

The rear locking seat 3 is of cup form and has a cylinder portion 3a and a bottom 3b, in which a through hole 11 is formed coaxially, as shown in FIG. 3. The outer wall of the bottom is cut so as to form a step portion and, at a diametrically opposite position, another step portion having different thickness. The open end of seat 3 abuts on the seat 8 in the casing 2, and the cylinder portion 3a has contact with the inner wall of the casing 2. In addition, the cylinder portion 5a of the tension rod 5 is inserted in the through hole 11.

The front locking seat 4 is of cup form and has a cylinder portion 4a and a bottom 4b having a coaxial through hole 13. The cylinder portion 4a has contact with the inner wall of the casing 2. The cylinder portion 5a of the tension rod is inserted in the through hole 13.

In this manner, the rear and front locking seats 3 and 4 are set longitudinally in series, and the set of locking seats is externally inserted over the tension rod 5. Seats 3 and 4 and rod 5 are mounted in the casing 2 and locked with a snap ring 16 fixed in a ring groove 15 formed on the inner wall of the housing.

The compression spring 6 is inserted in the tension rod 5, the rear end of which abuts on the seat 8 and front end of which abuts on the rear side of the cap formed by round head 5b. Compression spring 6 works as an urging means for the tension rod 5. However, in storing and transporting conditions, before the belt tensioner is mounted on the equipment, an axial motion of tension rod 5 due to the compression spring 6 is prevented with a locking pin 17 inserted onto the step portion of skirt 5c through a through hole formed on the cylinder portion 3a and a coaxial through hole 2a formed on the casing 2. An elastic component 18 is inserted in the through hole 2a on the casing 2 so as to seal the through hole 2a after taking off the pin 17.

The coil spring 7 is closely wound with square wire so that the inner diameter may be little smaller than the outer diameter of the cylinder portion 5a of the tension rod 5. Therefore, the spring has to be mounted externally on the tension rod by enlarging its diameter so that the spring closely fits on the outer surface of the cylinder portion 5a of the tension rod after being inserted over the outer surface. Further, the spring 7 is positioned between the inner bottom of the front locking seat 4 and the rear locking seat 3 as shown in the FIG. 2.

Figure 4A:
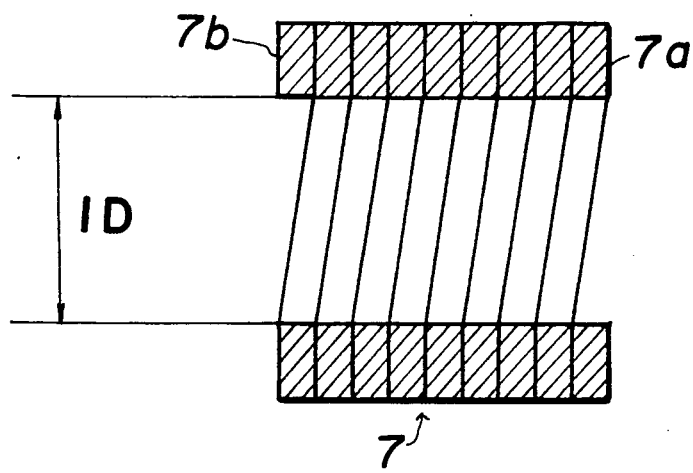
FIG. 4a shows, in vertical section, a coil spring used for the tensioner in an erect position.
Figure 4B:
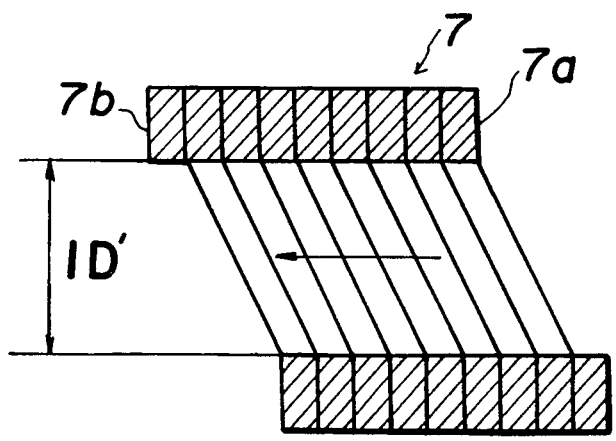
FIG. 4b shows, in vertical section, the coil spring in inclined position.

The coil spring 7 functions as illustrated in the sectional views of FIG. 4. The free state of the coil spring is shown in FIG. 4 (a), and a diagonally compressed state of the coil spring is shown in FIG. 4 (b). The inner diameter ID of the coil spring 7 reduces upon movement of tension rod 5 against the force of spring 6 by turning to ID', and causes a gripping action on the tension rod 5.

The gripping action of the coil spring 7 becomes minimum when the front end 7a of the spring abuts on the inner bottom 14 of the front locking seat 4 due to the urging position of tension rod as shown in the FIG. 4 (a). The gripping action of spring 7 becomes maximum when the rear end 7b of the spring abuts on the rear locking seat 3 due to the retreating motion of the tension rod, as shown in FIG. 4 (b).

The compression spring 6 can function to urge the tension rod 5 against the minimum gripping force of the coil spring 7 when the front end 7a abuts on the inner bottom 14 of the front blocking component seat 4. Accordingly, the urging motion of tension rod 5 is provided by the compression spring 6, and the retreating motion of tension rod 5 can be prevented by the maximum gripping action of coil spring 7. However, further retreating motion of the tension rod 5 is still possible, but only when the gripping force of spring 7 is exceeded by an external force applied on the head 5b of the tension rod 5.

Hereinafter, the function of the tensioner 1 will be described in detail. The head 5b of tension rod 5 is fixed in a predetermined position with bolts inserted through the two through holes 9a. The head 5b abuts indirectly on a belt or chain of which tension is already adjusted. Then, the pin 17 is taken out and, accordingly, the tension rod 5 can be urged by the compression spring 6 so that the round surface of head 5b may abut on a tension pulley (not illustrated) to apply tension. The counterforce of belt or chain is transmitted from belt or chain to the tension rod 5. The urging motion of tension rod 5 is stopped when the counterforce from belt or chain slightly exceeds the urging force provided by spring 6 to the tension rod 5. At the moment, the rear end 7b of coil spring 7 abuts on the rear locking seat 3. Thus, the belt or chain can be maintained at a predetermined tension by the locked tension rod 5. When the tension on the belt or chain is slackened and the urging force of tension rod 5 exceeds the counterforce from the belt or chain, the front end 7a of coil spring 7 abuts on the inner bottom 14 of front locking component seat and the gripping force on the tension rod is reduced. Accordingly, the tension rod 5 can be urged to provide adequate tension on the belt or chain again. In this manner, the belt or chain can be kept in predetermined tension constantly without being slackened continuously.

Also, it is possible that the belt or chain will be tensed excessively, due to excessive urging of tension rod 5. Then, the counterforce from the belt or chain becomes so large that it may exceed the maximum gripping force of the coil spring 7 for preventing the retreating motion of tension rod 5. Then the tension rod 5 can retreat more because of slippage between itself and the coil spring 7. In this manner, an excessive tension on the belt or chain can be avoided.

Figure 5A:
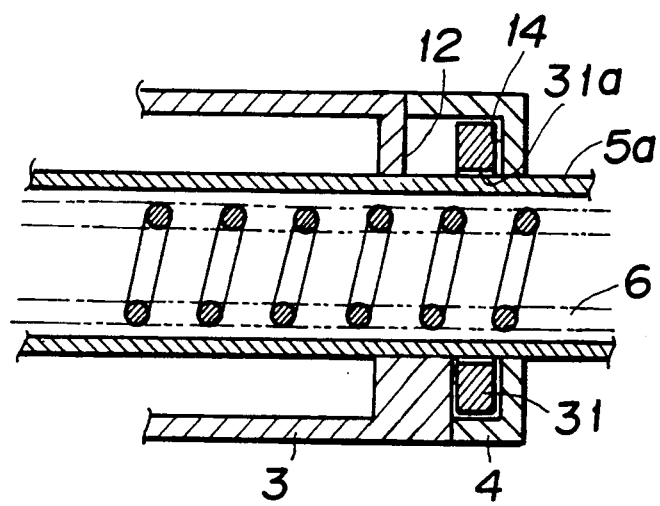
FIG. 5a shows in amplified section, a main portion of the tensioner in an urging position
Figure 5B:
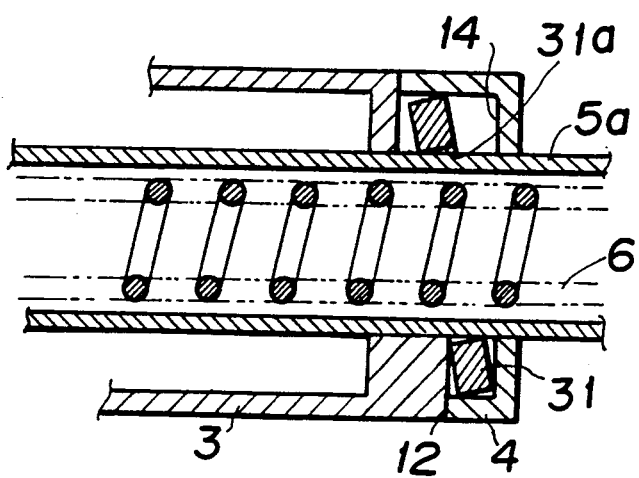
FIG. 5b shows the same in a retreating position.

FIG. 5 illustrates another embodiment according to the present invention.

In this tensioner embodiment, a flat ring 31 is used in the place of the corresponding coil spring 7 of the tensioner 1 of the former embodiment.

As shown in the FIG. 5, the cylinder portion 5a of tension rod 5 is inserted in the through hole of the flat ring and also through holes of front and rear locking seats. The through hole on the ring 31 functions as the coil spring 7 in the former embodiment functions. FIG. 5 (a) shows the flat ring in a perpendicular position in relation to the tension rod (not illustrated) and FIG. 5 (b) shows the flat ring in a diagonal position in relation to the tension rod (not shown), wherein the apparent inside diameter ID' is smaller than the inside diameter ID.

Figure 6A:
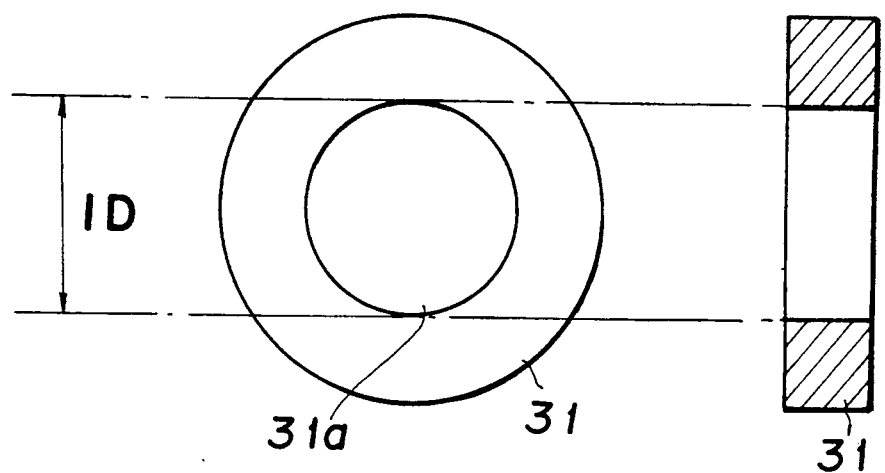
FIG. 6a shows an amplified section and front view of flat washer used as locking component in urging position of tension rod and FIG. 6b shows the same in retreating position.
Figure 6B:
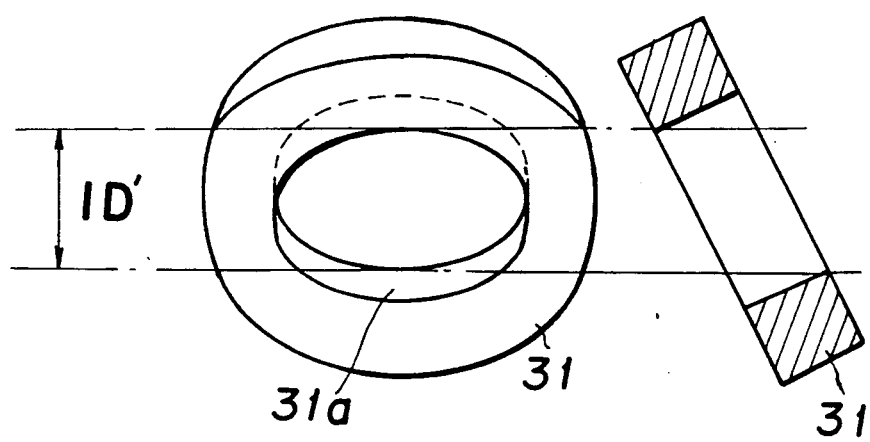
Figure 7:
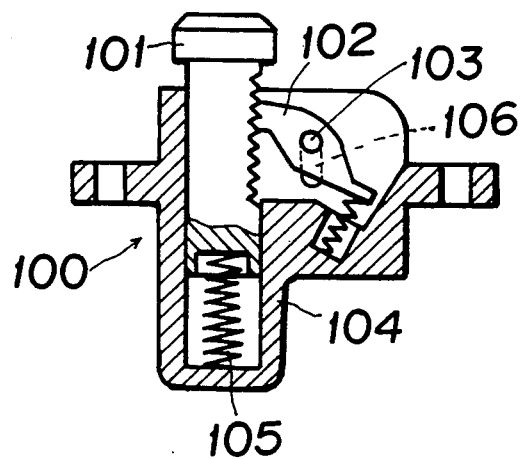
FIG. 7 shows a section of a conventional tensioner.

The gripping force of the flat ring 31 on the tension rod 5 is minimum when the front surface of the ring abuts on the inner bottom 4b of the front locking component seat 4, as shown in FIG. 6 (a). The gripping force becomes maximum when the rear face of flat ring 31 abuts on the rear locking component 3 due to the retreating tension rod 5 as shown in FIG. 6 (b). Accordingly, the flat ring provides the same function for preventing an excessive tension and keeping adequate tension on belt or chain as the coil spring 7 of the tensioner 1.

In conclusion, the effect of the present invention can be summarized as follows:

(1) It is sufficient to design a smaller compression spring having a necessary capacity for urging the tension rod, because the tensioning operation on belt or chain is done by the locked tension rod. Therefore, it is possible to get a light and compact tensioner by designing a compression spring of smaller diameter than a spring necessary for tensioning the belt or chain in a conventional belt or chain tensioner.

(2) It is possible to prevent an accident due to excessive tension on a belt or chain because the tension rod can be retreated firmly only by the excessive counterforce from the belt or chain.

(3) The locking force on the retreating tension rod is constant in spite of the stroke of the tension rod and also can be selected optionally by changing the locking component, permitting an ample design range.

What is claimed is:

1. A belt or chain tensioner for keeping adequate tension on a belt or chain comprising:

a tension rod having a longitudinally extending central axis;

a casing having a bore formed therein and including a bottom closing one end of said bore;

a compression spring mounted between said tension rod and said casing, said compression spring urging said tension rod in an advancing direction;

a cup shaped rear locking seat with a through hole formed in a bottom thereof through which said tension rod extends, said rear locking seat fixed in position relative to the bottom of said casing, the rear locking seat including a first radially inwardly extending bottom flange formed thereon, said first bottom flange having diametrically opposite portions having a difference in thickness in relation to said central axis;

a cup shaped front locking seat with a through hole formed in a bottom thereof through which said tension rod extends, said front locking seat fixed in position relative to said casing in front of said rear locking seat, said front locking seat including a second radially inwardly extending bottom flange formed thereon;

a locking component inserted between said first and second radially inwardly extending bottom flanges and externally on said tension rod, said locking component moving with said tension rod between a free state, in which said locking component engages said second bottom flange and grips said tension rod with a minimum frictional force, and a diagonally compressed state, in which said locking component engages said first bottom flange and grips said tension rod with a maximum frictional force, said compression spring moving said tension rod in said advancing direction when said locking component is in said free state and counterforce from said belt or chain is less than a force applied by said compression spring on said tension rod, and being prevented from moving said tension rod in said advancing direction when said locking component is in said diagonally compressed state and counterforce from said belt or chain is greater than the force applied by said compression spring on said tension rod;

a skirt portion provided on said tension rod, said skirt portion inserted in said rear locking seat; and a pin inserted through a hole in said casing for engaging said skirt portion to selectively lock said tension rod against movement.

2. A belt or chain tensioner according to claim 1, wherein said first and second bottom flanges also work as bearings for said tension rod.

3. A belt or chain tensioner according to claim 1, wherein said locking component is a coil spring made of square wire.

4. A belt or chain tensioner according to claim 1, wherein said locking component is a flat ring.

5. A belt or chain tensioner according to claim 1, wherein said diametrically opposite portions are formed from a continuous inclined surface.

6. A belt or chain tensioner according to claim 1, wherein said diametrically opposite portions are independent salient portions.

* * * * *